United States Patent [19]

Thoren

[11] 4,227,378
[45] Oct. 14, 1980

[54] METHOD AND DEVICE FOR IMPROVING THE EFFICIENCY OF A HEAT GENERATOR

[76] Inventor: Sten Thorén, c/o Sten Thorens Elektriska, 870 15 Utansjö, Sweden

[21] Appl. No.: 910,893

[22] Filed: May 30, 1978

[30] Foreign Application Priority Data

Jun. 2, 1977 [SE] Sweden .............................. 77 064665

[51] Int. Cl.³ ...................... F25D 21/12; F25D 23/02; F25D 29/00; F25B 47/00
[52] U.S. Cl. ........................................ 62/82; 62/265; 62/267; 62/278; 62/409
[58] Field of Search ................... 62/82, 277, 278, 248, 62/255, 256, 150, 151, 406–410, 265, 267

[56] References Cited

U.S. PATENT DOCUMENTS

| | | | |
|---|---|---|---|
| 2,211,886 | 8/1940 | Dudley | 62/409 |
| 2,212,356 | 8/1940 | Shure | 62/409 |
| 2,272,302 | 2/1942 | Krackowizer | 62/267 |
| 2,759,339 | 8/1956 | Kundert | 62/278 |
| 3,115,017 | 12/1963 | Kocher et al. | 62/265 |

Primary Examiner—Lloyd L. King
Attorney, Agent, or Firm—Birch, Stewart, Kolasch & Birch

[57] ABSTRACT

The present invention is directed to a method and apparatus for heat generation or heat exchange in which a primary medium emits heat while passing through an evaporator in which there is a heat-transfer medium which thereby evaporates or boils and thereby increases the pressure of the heat-transfer medium. Once the pressure has increased, it is transferred to a condensor where a secondary medium is heated from the condensation of the heat-transfer medium. The method and device according to the present invention increase the efficiency, particularly when the primary medium is at a low temperature, by intensifying the heat at least in a portion of the evaporator.

11 Claims, 2 Drawing Figures

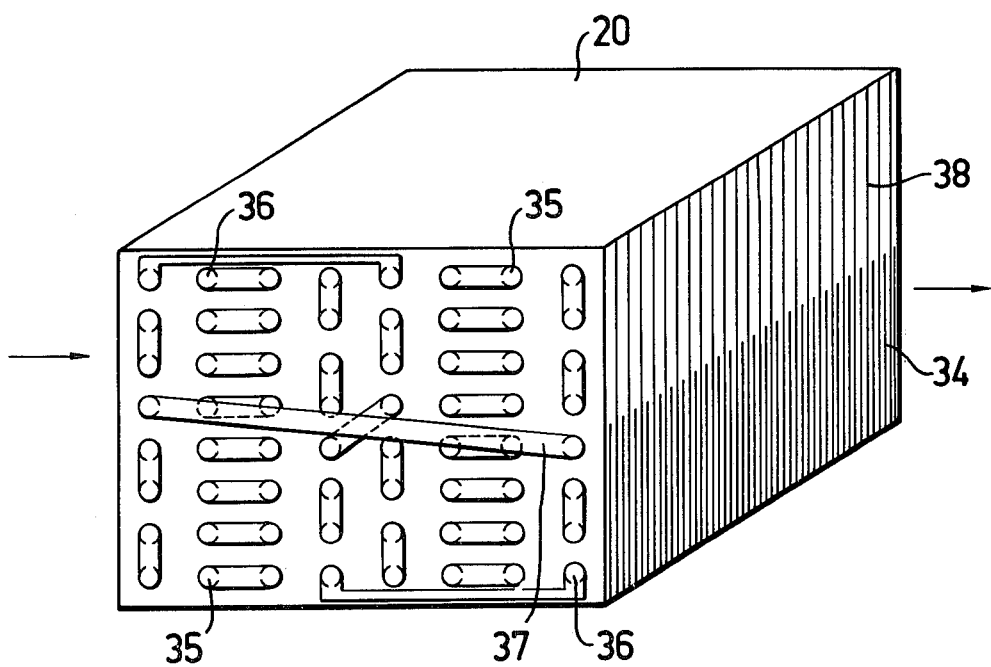

METHOD AND DEVICE FOR IMPROVING THE EFFICIENCY OF A HEAT GENERATOR

BACKGROUND AND SUMMARY OF THE INVENTION

The present invention relates to a method and a device for improving the efficiency of a heat generator, e.g. a heat pump.

Heat generators of the heat pump type function in a conventional manner by passing a medium, e.g. water, air or similar medium, through an evaporator, the heat emitted being used to evaporate a refrigerant which, once its temperature and pressure have been raised, condenses in a condensor thereby transferring heat to a second medium-the medium to be heated. The efficiency or coefficient of performance (COP) of such a process depends on the difference in temperature between the evaporator and the condensor and decreases the greater that difference becomes. This means that the efficiency or COP decreases considerably with drops in the temperature of the first medium from which heat is extracted.

The quantities of the heat source medium required for heating purposes in the process described are so large that only heat sources such as those found in nature, e.g. water or atmospheric air can be used as heat source media for normal operations. Although it is possible to use water as a source of heat as mentioned above, for the sake of simplicity the following description refers to atmospheric air as the heat source medium.

The decrease in the COP described above means that when outside air is used as a heat source the COP will be lowest at low outdoor temperatures-just when the heat is most needed. In known applications of the process the COP becomes greatly reduced even at an outdoor temperature of 0° C. although even colder air contains considerable amounts of heat. Additional heat must therefore be supplied at temperatures below freezing and known applications of the process are economical only down to outdoor temperatures of −5° C.

Therefore the main purpose of the present invention is to provide a method of improving the efficiency of a heat generator of the type described above so that it can be used with low-temperature source media without the necessity of providing additional heating.

This is achieved by the method and device the characteristics of which are contained in the following patent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagrammatic representation of a section through the evaporator unit of the device shown in FIG. 1.

DETAILED DESCRIPTION OF THE INVENTION

Figure 1:
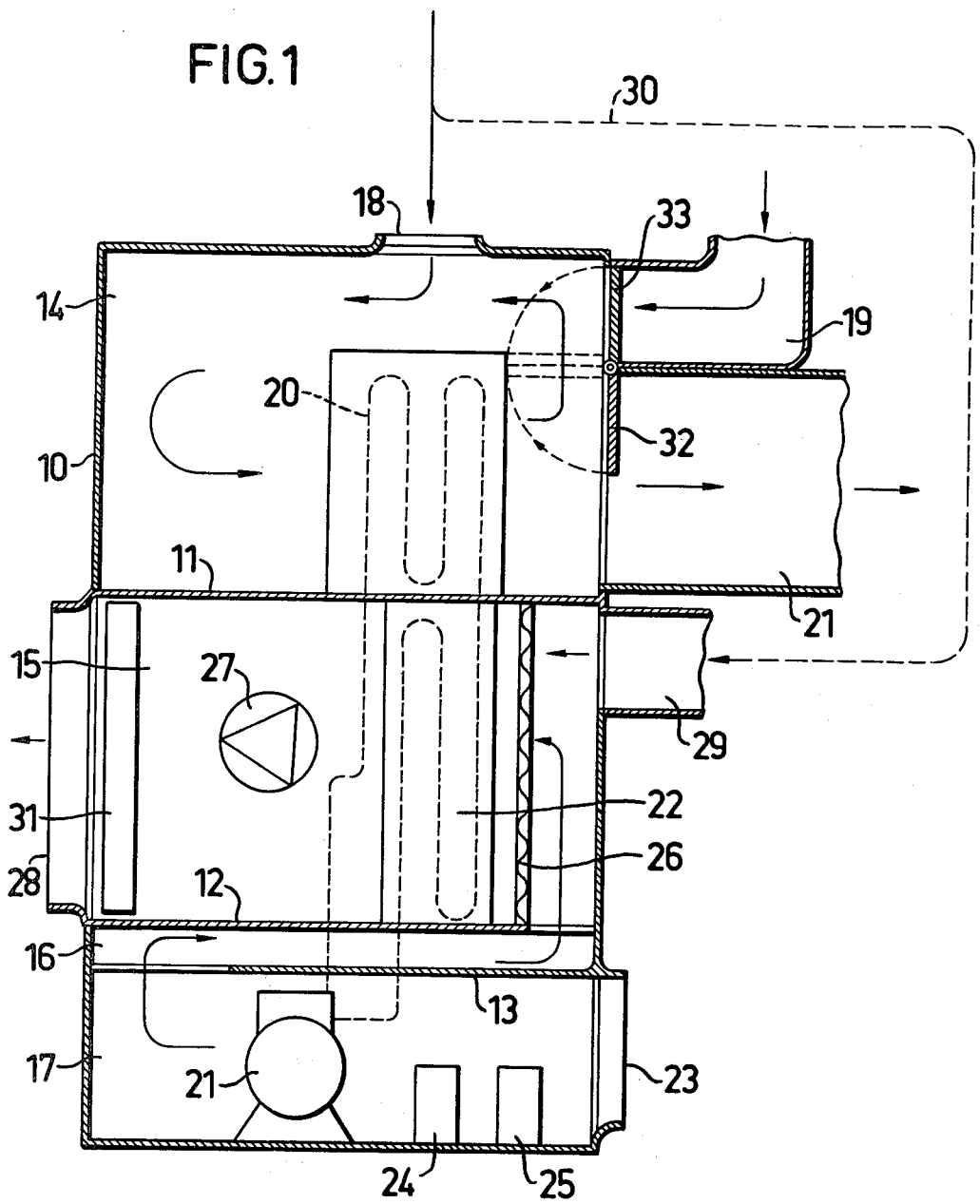
FIG. 1 is a diagrammatic representation of a section through a heat pump designed according to the invention.

The heat pump shown in FIG. 1 consists of a jacket or body 10 which is divided up by partition walls 11-13 into several chambers 14-17 running vertically. The upper chamber 14 is provided with an inlet connection 18 through which exhaust air, a primary medium, is admitted from the premises served by the heat pump. An inlet connection 19 is also provided in chamber 14 for the introduction of outdoor air which is mixed with the exhaust air from the premises, which together form a primary medium, and is then passed through the evaporator 20 which removes the heat from the air mixture. The chamber 14 is also equipped with an outlet connection 21 through which the air that has passed through the evaporator 20 is discharged into the atmosphere.

The evaporator 20 is connected via a compressor 21 to a condenser 22 situated in chamber 15. The condensor 22 is used as a heat source for the outdoor air which is blown into the premises served by the heat pump. In the embodiment shown the outdoor air is introduced via an inlet connection 23 in the lower chamber 17 housed in the body 10. All the components required to operate the heat pump, e.g. the compressor 21, the regulating devices 24, 25, etc., are situated in chamber 17. The heat emitted by several of the components in operation heats up the supply air or secondary fluid medium entering through the connection 23. The supply air pre-heated in this way then flows via chamber 16 to the condensor 22 situated in chamber 15. A filter 26 can be installed in front of the condensor 22. A fan 27 is positioned behind the condensor 22 in order to provide the requisite air circulation and to blow the air via outlet connection 28 into the premises being served, possibly through ventilation ducts or similar outlets. The chamber 15 can also be fitted with an inlet connection 29 for the supply of some of the exhaust air from the premises via the dotted branch pipe 30 for mixing with the incoming air. This supply can be controlled by a regulating device (not shown) in a conventional manner. In some cases it can be necessary to supplement the device by installing a unit for providing additional heat to the air, using the heating coil 31 positioned, for example, before the outlet connection 28. As can be seen from FIG. 1, the air currents in the different sections of the heat pump are represented by arrows which in most cases have not been numbered.

The heat pump described above works in the conventional manner, i.e. a heat-transfer medium or a refrigerant such as freon or similar medium is made to evaporate or "boil" in the evaporator 20 by using heat absorbed from the mixture of exhaust air and cold outdoor air introduced through the inlet connections 18, 19. The compressor 21 extracts the vapour from the evaporator 20 and compresses it to a higher pressure whereupon the vapour is transferred to the condensor 22 where it condenses, giving off heat to the incoming supply air. The requisite pressure difference in the circuit is obtained in a conventional manner using the regulating devices diagrammatically marked 24, 25. The supply air is heated as described when passing through the chamber housing the components, the components being simultaneously cooled as required. Under bad conditions the supply air can also be mixed with some of the exhaust air via the inlet connection 29 as described and be filtered by a filter 26 before entering the condensor 22. The supply air can be further heated under extreme conditions by additional heat diagrammatically represented at 31 before being introduced into the premises.

As mentioned in the introduction the process functions with a steady, high efficiency with a heat source medium at a high temperature, i.e. when the difference between the temperatures of the heat source medium and the heat-absorbing medium is small. When the temperature of the heat source medium, in this case a mixture of exhaust air and cold outdoor air, drops the efficiency is considerably decreased. The process can also lose efficiency when the evaporator 20 becomes frosted up. This invention now means that it is possible to achieve a substantial improvement in efficiency/COP, particularly under the conditions described where there are large differences in the temperatures of the heat source medium and the heat-absorbing medium, by subjecting at least a part of the evaporator 20 to intensive heating. Normally this heating can be achieved by using special media or devices, e.g. heating coils, immersion heaters, etc., but in the particularly advantageous embodiment shown in the drawing the intensive heating is effected with the aid of the current of air itself. Some of the air current that is used as a heat source is made to recirculate several times through at least a part of the evaporator, preferably through the upper section of the evaporator 20, as shown in FIG. 1. This recirculation of the air then takes the form of a rapidly rotating or whirling air current which is made to pass several times through the part of the evaporator 20 in question. Recirculation can be achieved by using air current control devices of varying degrees of sophistication, but for the sake of simplicity this is shown in the drawing as a baffle plate 32 situated in the outlet connection 21 in front of the section of the evaporator 20 previously mentioned. The plate 32 directs a portion of the air current back for recirculation as mentioned. Naturally the size of the baffle plate 32 can be made variable in order to recirculate a larger or smaller portion of the current of air leaving the evaporator 20.

The supply of outdoor air through the intake 19 is reduced simultaneous with a part of that air that has passed through the evaporator 20 being circulated. This is shown diagrammatically as being effected with the help of a flap 33. In this way the above-mentioned recirculation of hot air through the evaporator is obtained while the balance of air in the apparatus is maintained at the same time by throttling the inlet 19 while simultaneously reducing the outlet 21. It is best that the inlet 19 and the outlet 21 are throttled successively and in unison. Suitable control devices can be installed to set the flaps 32, 33 automatically. These are well known and therefore have not been described here.

It has surprisingly been shown that rapid recirculation of air through a part of the evaporator 20 results in a considerable improvement in efficiency even when cold outdoor air is partially supplied through the inlet connection 19. At lower temperatures the supply of outdoor air through inlet 19 is totally shut off as described previously. In this way a steady level of efficiency or COP is obtained even down to outdoor temperatures of $-20°$ C. to $-25°$ C.

The effect achieved is further augmented by a special design of the evaporator 20 as shown in FIG. 2. As can be seen from FIG. 2 the evaporator 20 is equipped with heat transfer flanges or fins 38 which on the upper or "hot" section of the evaporator battery are at a greater distance from each other than the flanges or fins 34 on the lower or "cold" section of the evaporator 20. The heat content of the heat source medium, i.e. air, is consequently utilized to the fullest extent in the lower section of the evaporator 20 with the closely-packed fins 34, while the fewer fins 38 on the upper half of the evaporator 20 facilitate the rapid air circulation which is necessary to achieve the purpose of the invention. As can be seen from FIG. 2 the evaporator possesses other design features which aid in a more steady and improved utilization of heat transfer by, as shown by this embodiment, the use of two coils which change sides at approximately half way up the evaporator, indicated by pipe 37. The coil 35 which is placed in the current of air, which is indicated by the arrows in FIG. 2, is positioned at the opposite end in relation to the current of air in the upper half of the evaporator 20, while the other coil 36 is laid in the opposite way. In this way the transfer of heat from the air current to the heat-transfer medium or refrigerant in the evaporator 20 is evened out.

Even though the invention described above relates to a heat pump which works with air as both the heat source medium and the heat-absorbing medium, it can obviously be applied to other types of heat pumps, e.g. where the heat-absorbing medium is water. Water can also be used as the heat source medium as is already known. The general construction of the heat pump shown is also naturally only one example of the realization of the invention and alterations and modifications can obviously be made in the embodiment shown without losing the concept behind the invention. Efficiency can be further improved by using recognized principles, e.g. by taking the ventialtion air entering the connection 23 from a pre-heated source such as an earth chamber or similar.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In the method of heat generation in a heat pump in which a heat-transfer fluid is circulated between an evaporator section and a condensor section and in which the heat-transfer fluid in the evaporator section is heated by means of an initial indirect heat exchange with a primary fluid medium circulating through said evaporator section, said heat-transfer fluid being evaporated and circulated to the condensor section in which a second indirect heat exchange transfers the heat from the heat-transfer fluid to a secondary fluid medium passing through the condensor section, the improvement for increasing the efficiency of the heat pump comprising the steps of intensively heating at least a portion of the evaporator section by means of circulating said primary fluid medium through said portion of said evaporator section by diverting at least a portion of the primary fluid medium downstream of the evaporator section to flow several times through said evaporator section to intensify the heating thereof.

2. The method according to claim 1, wherein the primary medium comprises ambient air mixed with warm exhaust air, and further including the step of forcing circulation of said primary medium while simultaneously partially or totally throttling the supply of ambient air.

3. The method according to claim 2, wherein the secondary fluid medium comprises ambient air mixed with warm exhaust air and further including the step of pre-heating said ambient air by circulating the ambient air over heat-emitting components.

4. A heat pump for transferring heat between a primary medium, a heat-transfer medium and a secondary medium comprising:
   a housing including several chambers forming fluid passageways;
   an evaporator operatively disposed in a first chamber and being in fluid communication with a primary fluid;
   a condensor operatively disposed in a second chamber and being in fluid communication with a secondary fluid;
   a compressor operatively disposed in a third chamber and being in fluid communication with a portion of said secondary fluid;
   said evaporator, condensor and compressor forming a circuit for circulating a heat-transfer medium, said heat-transfer medium being heated by means of an initial indirect heat exchange with said primary fluid circulating through said first chamber and said heat-transfer medium being evaporated and circulated to said condensor in which a second indirect heat exchange transfers the heat from the heat-transfer medium to said secondary fluid circulating through said second chamber; and
   means for diverting at least a portion of said primary fluid downstream of said evaporator and recirculating said portion of said primary fluid to flow several times through at least a portion of said evaporator to intensify the heating thereof.

5. A heat pump according to claim 4, wherein said primary fluid comprises ambient air mixed with warm exhaust air and said primary fluid being circulated through said evaporator while simultaneously partially or totally throttling the supply of ambient air.

6. A heat pump according to claim 4, wherein said evaporator including a plurality of fins being positioned in spaced apart relationship relative to each other in said portion of said evaporator being intensively heated and said plurality of fins being positioned in close proximity relative to each other throughout the remaining portion of said evaporator.

7. A heat pump according to claim 6, wherein the portion of said primary fluid being diverted is recirculated through said intensively heated portion of said evaporator.

8. A heat pump according to claim 4, wherein said compressor positioned in said third chamber heats said portion of said secondary fluid being circulated therethrough.

9. A heat pump according to claim 4, wherein said means for diverting at least a portion of said primary fluid comprises a flap being adjustable to vary the quantity of diverted primary fluid.

10. A heat pump according to claim 4, wherein said means for diverting at least a portion of said primary fluid comprises a louver being adjustable to vary the quantity of diverted primary fluid.

11. A heat pump for transferring heat between a primary medium, a heat-transfer medium and a secondary medium comprising:
   a housing including several chambers forming fluid passageways;
   an evaporator operatively disposed in a first chamber and being in fluid communication with a primary fluid;
   a condensor operatively disposed in a second chamber and being in fluid communication with a secondary fluid;
   a compressor operatively disposed in a third chamber and being in fluid communication with a portion of said secondary fluid;
   said evaporator, condensor and compressor forming a circuit for circulating a heat-transfer medium, said heat-transfer medium being heated by means of an initial indirect heat exchange with said primary fluid circulating through said first chamber and said heat-transfer medium being evaporated and circulated to said condensor in which a second indirect heat exchange transfers the heat from the heat-transfer medium to said secondary fluid circulating through said second chamber;
   at least a portion of said evaporator being intensively heated by circulating said primary fluid through said portion of said evaporator section; and
   said evaporator including a first and second coil system disposed adjacent to each other for circulating said heat-transfer medium, at least half of second coil system being positioned downstream and behind said first coil system and at least half of said first coil system being positioned downstream and behind said second coil system.

* * * * *